United States Patent
Hisada et al.

(10) Patent No.: US 8,430,977 B2
(45) Date of Patent: Apr. 30, 2013

(54) HOLLOW DRILLING STEEL ROD AND METHOD OF MANUFACTURING THE SAME

(75) Inventors: Masaya Hisada, Gifu (JP); Yoneo Hiwasa, Gifu (JP); Satoshi Nagase, Tokyo (JP); Noritaka Takahata, Tokyo (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 13/399,063

(22) Filed: Feb. 17, 2012

(65) Prior Publication Data

US 2012/0211127 A1 Aug. 23, 2012

(30) Foreign Application Priority Data

Feb. 18, 2011 (JP) ................. 2011-033941

(51) Int. Cl.
- *C22C 38/00* (2006.01)
- *C22C 38/22* (2006.01)
- *C22C 38/44* (2006.01)
- *C22C 7/00* (2006.01)
- *B32B 15/01* (2006.01)

(52) U.S. Cl.
USPC ........... 148/333; 148/334; 148/335; 148/400; 148/516

(58) Field of Classification Search ............. 148/333, 148/334, 335, 400, 516
See application file for complete search history.

(56) References Cited

U.S. PATENT DOCUMENTS

| 5,919,578 A | 7/1999 | Lundell |
| 6,095,266 A | 8/2000 | Lundell |
| 2009/0266615 A1 | 10/2009 | Yao |

FOREIGN PATENT DOCUMENTS

| CN | 1837395 A | 9/2006 |
| CN | 2893126 Y | 4/2007 |
| JP | 62-230955 A | 10/1987 |
| JP | 2000-503903 A | 4/2000 |
| JP | 2000-513057 A | 10/2000 |
| JP | 2001-502021 A | 2/2001 |
| JP | 2001-342788 A | 12/2001 |
| JP | 2003-166037 A | 6/2003 |
| JP | 2008111146 A * | 5/2008 |
| WO | WO 97/48516 A1 | 12/1997 |
| WO | WO 03/071088 | 8/2003 |

OTHER PUBLICATIONS

Extended European Search Report dated Jan. 2, 2013.

* cited by examiner

*Primary Examiner* — Keith Walker
*Assistant Examiner* — Alexander Polyansky
(74) *Attorney, Agent, or Firm* — McGinn IP Law Group, PLLC

(57) ABSTRACT

The present invention relates to a hollow drilling steel rod including a stem portion and a thread portion positioned at an end portion in an axial direction with respect to the stem portion, the hollow drilling steel rod being constituted of a steel having a specific composition described in the present specification, in which the thread portion includes a thread having been subjected to a high frequency quenching, and the thread portion and the stem portion separate from each other have been joined by a friction welding.

2 Claims, 3 Drawing Sheets

FRICTION WELDED PORTION

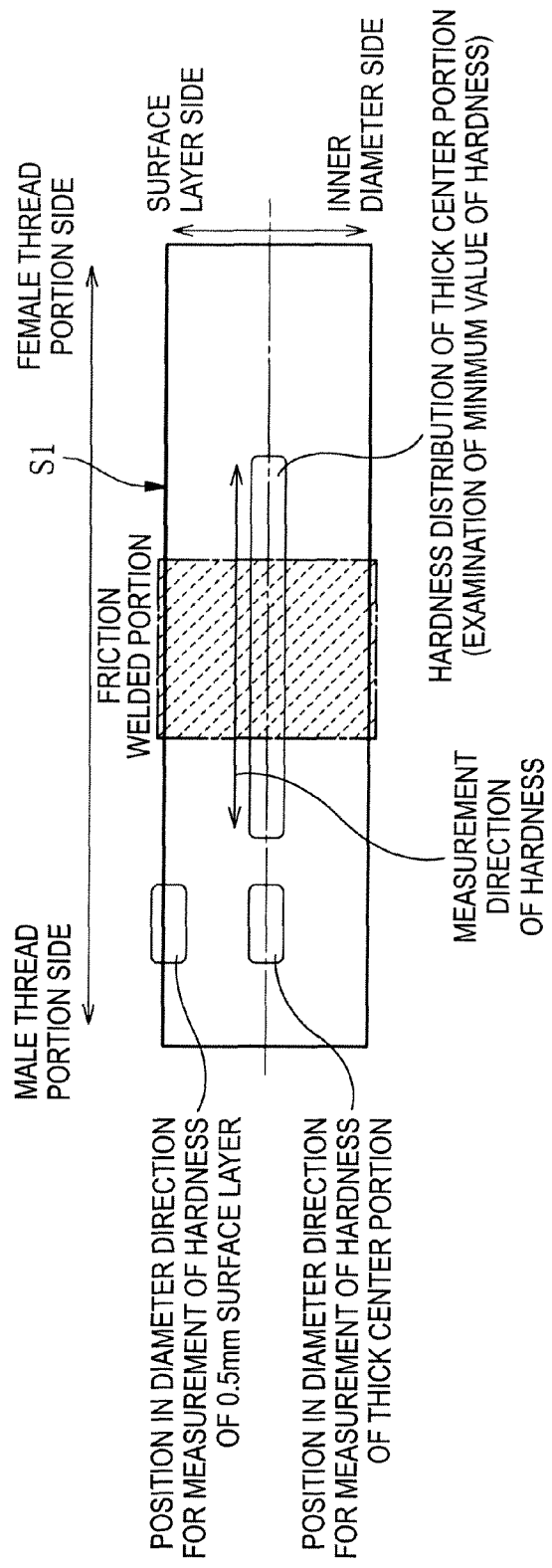

TEMPERATURE DISTRIBUTION

HARDNESS DISTRIBUTION

HOLLOW DRILLING STEEL ROD AND METHOD OF MANUFACTURING THE SAME

FIELD OF THE INVENTION

The present invention relates to a hollow drilling steel rod for use in extraction of minerals, tunnel drilling and the like, and a method of manufacturing the same.

BACKGROUND OF THE INVENTION

Hollow drilling steel rods for use in extraction of minerals, tunnel drilling, etc. (hereinafter, also referred to simply as "drilling rod(s)") generally have a stem portion, and a thread portion positioned at each end portion in an axial direction with respect to the stem portion, and has a hollow formed in the axial direction at a center portion of a horizontal section throughout the entire length.

As this kind of drilling rod, there have been a drilling rod having a male thread portion at one end portion in an axis direction with respect to a stem portion and a female thread portion at the other end portion, a drilling rod having male thread portions at both end portions in an axis direction with respect to a stem portion, and so on.

The thread portions of the drilling rods require high wear resistance, and thus threads of this kind of drilling rods are subjected to a carburizing and quenching process or a high frequency quenching process for achieving high strength.

Conventionally, as a method of manufacturing a drilling rod, there has been employed a method including performing a cutting process on an end portion of a long hollow steel bar having a length corresponding to a final drilling rod to thereby form a thread (in a case where the thread is a female thread portion, upset forging is performed on an end portion in an axial direction to increase a diameter and then threading for forming a female thread is performed), and then performing carburizing and quenching on the entire hollow steel bar or performing high frequency quenching is partially on the thread to thereby increase the strength, whereby a drilling rod having a stem portion and a thread portion is manufactured in a seamlessly continuous integral structure.

However, since the total length of the drilling rod is so long, for example, several meters, performing threading or upset forging on the long hollow steel bar is accompanied by a technical difficulty.

In addition, in order to perform heat treatment such as carburizing and quenching process or high frequency quenching process after the threading, large-sized carburizing and quenching equipment or high frequency quenching equipment is required.

In case of a drilling rod, in order to prevent the drilling rod from being bended due to the heat treatment, it is required to perform the heat treatment with the long drilling rod having a length of, for example, 4 meters to 5 meters suspended, and a large sized heat treatment furnace is required.

Further, since the drilling rod is long, there are problems also in handling such as moving of the drilling rod.

As another manufacturing method, as shown in a schematic view of FIG. 2A, there has been a method where a stem portion A and a thread portion B are separately manufactured as separate components, and they are then joined with each other by a friction welding, so as to be integrated.

In this manufacturing method, following advantages may be obtained. Firstly, it is possible to perform threading on a short material for the thread portion, and therefore the threading is easy. Further, large-sized heat treatment equipment is not required for strengthening the thread portion, unlike a case of performing the heat treatment on a long material having a seamlessly continuous integrated structure.

However, in this manufacturing method, the following unique problems occur.

In the friction welding, the stem portion and the thread portion are matched with each other in an axial direction, with a pressure being applied, and both portions are relatively rotated so as to be joined with each other by friction heat. In this case, generated heat causes a sudden rise in temperature at and around the joint portion as shown in FIG. 2B, and raises, particularly, the temperature of the joint portion, up to 1200 degrees (° C.) or more.

Next, the friction welded portion is air-cooled, such that the vicinity of the joint portion, specifically, a portion whose temperature has risen to a high temperature is cooled from a temperature which is below the quenching temperature. As a result, that portion becomes softer since the hardness of that portion is undesirably lowered (see FIG. 2C). That is, the hardness of that portion undesirably becomes lower than that of a portion which has not been influenced by the heat.

As described above, in the manufacturing method where the stem portion and the thread portion formed separately from each other are joined with each other by friction welding so as to be integrated, in order to secure characteristics (hardness) when the thread is subject to carburizing and quenching (or nitrocarburizing and quenching) so as to achieve high strength, materials containing a low amount of Cr and a high amount of Ni is applied. However, particularly in the case of these materials, during joining by friction welding, hardness around the joint portion becomes so low that the life of hollow drilling rods is shorten because a low-hardness portion becomes the origin to break.

In order to prevent this low-hardness portion from being generated to be a weak portion in terms of strength, it is effective to perform carburizing and quenching on the drilling rod throughout the entire length thereof after the joining. However, in this case, since a heat treatment is necessarily performed on the long drilling rod, large-sized heat treatment equipment is required. Therefore, the same problems as those in a case of manufacturing a drilling rod in a seamless continuous integral structure occur.

Incidentally, solutions in which a low-hardness portion is generated by friction welding so as to be a weak portion in terms of strength are disclosed in JP-T-2000-503903, JP-T-2000-513057, and JP-T-2001-502021.

Those solutions disclosed in these documents describe preventing a hardness around a joint portion from lowering greatly by friction welding, in order to achieve manufacturing it without a heat treatment such as carburizing after friction welding. In terms of this point, objects of those solutions are the same as an object of the present invention. However, those technologies disclosed in JP-T-2000-503903, JP-T-2000-513057, and JP-T-2001-502021 are different from the present invention in terms that, since carburizing or nitrocarburizing is performed on a thread portion to achieve high strength, steels disclosed therein contain a low amount of Cr (1.50% or less of Cr) and a high amount of Ni (0.5% or more of Ni).

SUMMARY OF THE INVENTION

The present invention has been made considering the above-mentioned circumferences, and an object of the present invention is to provide a hollow drilling steel rod and a method of manufacturing the same, which enable to prevent lowering in hardness around a joint portion of a stem portion and a thread portion by friction welding, thereby solving the problem in which the portion having a low strength becomes a weak portion in terms of the hardness such that the life of the hollow drilling steel rod is shorter.

Namely, the present invention provides a hollow drilling steel rod comprising a stem portion and a thread portion positioned at an end portion in an axial direction with respect to the stem portion, the hollow drilling steel rod being constituted of a steel having a composition consisting of, in terms of percent by mass:

0.20 percent to 0.80 percent of C,
0.10 percent to 0.50 percent of Si,
0.10 percent to 1.00 percent of Mn,
0.015 percent or less of P,
0.050 percent or less of S,
0.50 percent or less of Cu,
less than 0.50 percent of Ni,
2.00 percent to 5.00 percent of Cr,
0.20 percent to 0.80 percent of Mo,
0.0002 percent to 0.0050 percent of B,
0.005 percent to 0.050 percent of Ti,
0.005 percent to 0.050 percent of Al,
0.050 percent or less of N, and
the remainder being Fe and inevitable impurities,
wherein the thread portion comprises a thread having been subjected to a high frequency quenching, and
wherein the thread portion and the stem portion separate from each other have been joined by a friction welding.

Additionally, the present invention also provides a method of manufacturing a hollow drilling steel rod comprising a stem portion and a thread portion positioned at an end portion in an axial direction with respect to the stem portion, said method comprising:

separately constituting the stem portion and the thread portion with a steel having a composition consisting of, in terms of percent by mass:

0.20 percent to 0.80 percent of C,
0.10 percent to 0.50 percent of Si,
0.10 percent to 1.00 percent of Mn,
0.015 percent or less of P,
0.050 percent or less of S,
0.50 percent or less of Cu,
less than 0.50 percent of Ni,
2.00 percent to 5.00 percent of Cr,
0.20 percent to 0.80 percent of Mo,
0.0002 percent to 0.0050 percent of B,
0.005 percent to 0.050 percent of Ti,
0.005 percent to 0.050 percent of Al,
0.050 percent or less of N, and
the remainder being Fe and inevitable impurities;
subjecting a thread of the thread portion to a high frequency quenching; and then
joining the thread portion and the stem portion to each other by a friction welding.

As described above, according to the present invention, a steel having the above-mentioned chemical composition is applied to the steel for the rod, and the thread of the thread portion is previously subjected to a high frequency quenching and the thread portion and the stem portion formed separately from each other are joined by friction welding so as to integrate the thread portion and the stem portion, whereby the hollow drilling steel rod is manufactured.

According to the present invention, it is possible to perform machining on a short material for the thread portion and also to perform high frequency quenching for hardening of the thread. Therefore, technical difficulties when machining is performed on a long material for a long drilling rod having a seamless continuous integral structure and problems in which a large-sized heat treatment equipment is required may be solved. Consequently, it is possible to easily perform the threading and to easily perform even high frequency quenching as a heat treatment with small-scale equipment.

Further, it is possible to prevent a significant lowering in hardness of portions around the joint portion in an axial direction due to heating and subsequent cooling performed during joining of the stem portion and the thread portion by friction welding, thereby solving the problem in which a low-hardness portion causes origin to break of the drilling rod because of low hardness and, as a result, life of the rod is shortened.

In a conventional drilling rod formed by performing carburizing and quenching on a thread to achieve high strength and then integrating a stem portion and a thread portion with each other by friction welding, a steel containing a low amount of Cr and a high amount of Ni was applied as described above. However, in the present invention, a steel containing a high amount of Cr (2.00% to 5.00% of Cr) and a low amount of Ni (0.50% or less of Ni) is applied as the steel for the drilling rod, and a high frequency quenching is applied as the heat treatment for achieving the high strength of the thread. Therefore, during friction welding, even if a temperature of a portion around the joint portion rises up to a temperature below the quenching temperature and is then cooled, lowering in hardness at that portion can be effectively prevented owing to secondary hardening caused by precipitation of chromium carbide (additionally, molybdenum carbide), that is, effects of precipitation of carbide(s).

Therefore, according to the present invention, it is possible to effectively prevent lowering in hardness of a portion around the joint portion due to the friction welding, whereby it is possible to prevent that portion from becoming a weak portion in terms of the strength of the drilling rod, which causes a decrease in the life of the rod.

Furthermore, according to the present invention, thread portions positioned at both end portions of the rod in an axial direction may be formed separately from a stem portion, and be joined with the stem portion, thereby manufacturing a hollow drilling steel rod. Alternatively, either one of the thread portions may be formed integrally with the stem portion and only the other one of the thread portions may be formed separately from the stem portion and be joined with the stem portion by friction welding, thereby manufacturing a hollow drilling steel rod.

BRIEF DESCRIPTION OF THE DRAWINGS

FIGS. 1A to 1C are schematic diagrams of a drilling rod manufactured by a process according to an embodiment of the present invention, a test-piece taking position, and a method of measuring the minimum value of hardness.

Explanations of Numeral References and Signs

Figure 1A:
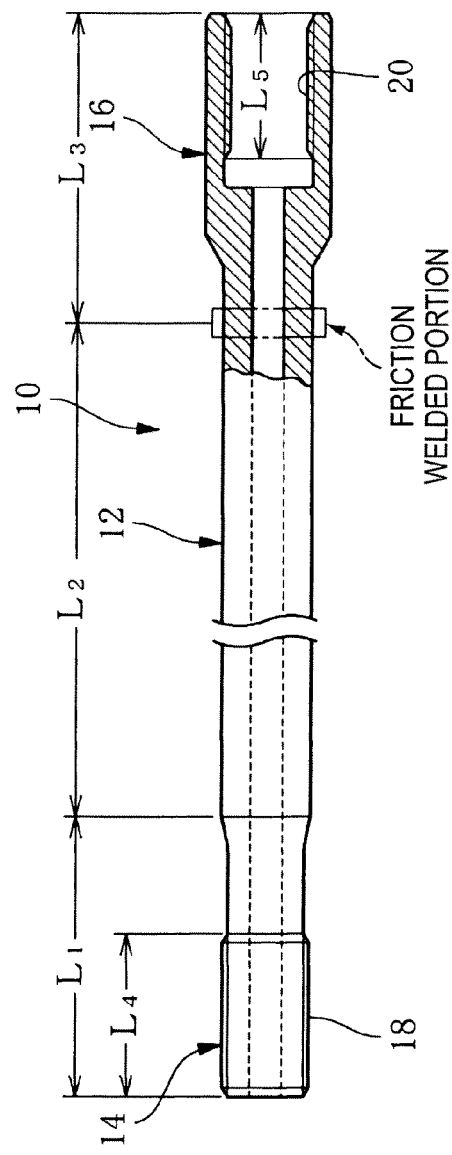

| | |
|---|---|
| 10 | drilling rod |
| 12 | stem portion |
| 14 | male thread portion |
| 16 | female thread portion |
| 18 | male thread |
| 20 | female thread |

DETAILED DESCRIPTION OF THE INVENTION

Next, a reason for adding each component of steel and a reason for restricting an amount of each component of steel in the present invention will be described below.

Herein, in the present specification, the terms "percent (%)" mean "percent (%) by mass" unless otherwise indicated.

C: 0.20% to 0.80%

C is effective for increasing both the hardness and strength of the steel. If the amount of C is less than 0.20%, desired hardness and strength cannot be obtained. Meanwhile, if the amount of C exceeds 0.80%, toughness and ductility are impaired. For these reasons, in the present invention, the amount of C is set within a range of 0.20% to 0.80%). Herein, the upper limit of the amount of C is preferably 0.40%.

Si: 0.10% to 0.50%

Si is added for deoxidization. In order to obtain that effect, an amount of 0.10% or more is required. However, if the amount exceeds 0.50%, toughness is deteriorated. Therefore, the amount of Si is set within a range of 0.10% to 0.50%. Herein, the upper limit of the amount of Si is preferably 0.40%.

Mn: 0.10% to 1.00%

Mn is an element which is effective in deoxidizing steel and is effective also in improving hardenability and obtaining hardness and strength after a heat treatment. In order to obtain these effects, the amount of Mn is set to be 0.10% or more.

However, if the amount of Mn exceeds 1.00%, the toughness is deteriorated. For these reasons, the amount of Mn is set within a range of 0.10% to 1.00%. Herein, the lower limit of the amount of Mn is preferably 0.30%. In addition, the upper limit of the amount of Mn is preferably 0.80%.

P: 0.015% or less

P is an impurity component, and P segregates on grain boundaries, such that the strength at the grain boundaries is lowered and hot workability and toughness are deteriorated. Therefore, it is preferable that the content of P is low. However, if the upper limit of the content of P is limited to a value smaller than 0.015%, refining cost increases. For this reason, the upper limit of the content of P is set to 0.015%. In addition, the upper limit of the amount of P is preferably 0.010%.

S: 0.050% or less

S is also an impurity component, and S weakens the strength at the grain boundaries to thereby deteriorate hot workability and toughness. Therefore, it is preferable that the content of S is low. However, if the upper limit of the content of S is excessively limited, refining cost increases. For this reason, the upper limit of the content of S is set to 0.050%. In addition, the upper limit of the amount of S is preferably 0.025%.

Cu: 0.50% or less

Cu is one of impurities contained in a raw material, and if a large amount of Cu is contained, hot workability becomes deteriorated. However, if the upper limit of the content of Cu is excessively limited, raw material cost increases. For this reason, the upper limit of the content of Cu is set to 0.50%. In addition, the upper limit of the amount of Cu is preferably 0.40%.

Ni: Less Than 0.50%

Ni is an element which is effective in improving hardenability and obtaining hardness and strength after heat treatment. However, if a large amount of Ni is contained, raw material cost increases. For this reason, the content of Ni is set to a value less than 0.50%. In addition, the upper limit of the amount of Ni is preferably 0.30%.

Cr: 2.00% to 5.00%

Cr is an element which forms carbide, heightens hardness, and improves wear resistance. During friction welding, since the portion around the joint portion is heated to a high temperature, local softening occurs at the corresponding portion by high-temperature tempering, resulting in origin to break. However, owing to the addition of Cr, the softening is suppressed by resistance to softening during tempering, and thus it is possible to prevent origin to break. In order to achieve this effect, the amount of Cr is set to 2.00% or more. Herein, the lower limit of the amount of Cr is preferably 2.80%. Meanwhile, if an excessive amount of Cr is added, toughness becomes deteriorated. For this reason, the upper limit of the amount of Cr is set to 5.00%. In addition, the upper limit of the amount of Cr is preferably 3.50%.

Mo: 0.20%, to 0.80%

Mo prevents softening by secondary hardening owing to generation of $Mo_2C$ during high-temperature heating. Therefore, Mo is effective in preventing the portion around the joint portion from softening during the friction welding. In order to achieve this effect, the lower limit of the amount of Mo is set to 0.20%. Herein, the lower limit of the amount of Mo is preferably 0.30%. Meanwhile, if an excessive amount of Mo is added, the cost increases, and the heat workability is reduced. For this reason, the upper limit of the amount of Mo is set to 0.80%. In addition, the upper limit of the amount of Mo is preferably 0.60%.

B: 0.0002% to 0.0050%

B is an element which is effective in improving heat workability and hardenability. In order to achieve these effects, the lower limit of the content of B is set to 0.0002%. Herein, the lower limit of the amount of B is preferably 0.0003%. Meanwhile, even if an amount larger than 0.0050% is added, the effects are saturated, and excessive addition causes an increase in cost. For these reasons, the upper limit of the amount of B is set to 0.0050%. In addition, the upper limit of the amount of B is preferably 0.0020%.

Ti: 0.005% to 0.050%

Ti preferentially couples with N so as to precipitate TiN and thus prevents precipitation of BN caused by coupling of B and N, thereby achieving the above-mentioned effects of addition of B. For this reason, in the steel of the present invention, 0.005% or more of Ti is contained. However, if Ti in an amount larger than 0.050% is contained, coarsening of TiN occurs, and fatigue breakage results from the coarsening. For this reason, according to the present invention, the content of Ti is set within a range of 0.005% to 0.050%. Herein, the lower limit of the amount of Ti is preferably 0.010%. In addition, the upper limit of the amount of Ti is preferably 0.030%.

Al: 0.005% to 0.050%

Al is an element which is effective in deoxidizing steel, and binds with N in preference to B, so as to prevent B from forming BN, resulting in loss of the above-mentioned effects.

In order to achieve the above-mentioned effect, it is required to add 0.005% or more of Al. Herein, the lower limit of the amount of Al is preferably 0.010%.

However, if Al in an amount larger than 0.050% is added, toughness becomes deteriorated. For this reason, the content of Al is set within a range of 0.005% to 0.050%. In addition, the upper limit of the amount of Al is preferably 0.040%.

N: 0.050% or less

N is an impurity component, and N couples with B to pricipitate BN, thereby obstructing the effects of adding B. In order to achieve the effect of adding B, in the present invention, the content of N is limited to 0.050% or less. In addition, the upper limit of the amount of N is preferably 0.030%.

In an embodiment, the steel used in the invention consists of the above-mentioned elements with the balance being Fe and inevitable impurities.

In this regard, with regard to each element contained in the steel used in the invention, according to an embodiment, the minimal amount thereof present in the steel is the smallest non-zero amount used in the examples as summarized in Table 1. According to a further embodiment, the maximum amount thereof present in the steel is the maximum amount used in the examples as summarized in Table 1.

Next, an embodiment of the present invention will be described below.

Steels each having a chemical composition shown in Table 1 were respectively melt in a 60-ton vacuum furnace, ladle refining (LF) and vacuum degassing (RH) were then performed thereon, followed by blooming, whereby billets were obtained.

Further, after perforation (Boring processing) was performed on the center portion of each billet, rolling was performed on the billet with a core material being inserted into the center portion, whereby two hollow round rods having diameter of 52 mm and 74 mm, respectively, were obtained.

With respect to the hollow round rod having a diameter of 52 mm, threading was performed on an end portion so as to make it into a member having a male thread portion 14 with a male thread 18 shown in FIG. 1A and a stem portion 12 integrated with each other, and then high frequency quenching was performed only on the male thread 18.

Meanwhile, with respect to the round rod having a diameter of 74 mm, threading was performed after cutting to form a female thread portion 16 with a female thread 20, and high frequency quenching was performed on the female thread 20.

Then, the member having the male thread portion 14 and the stem portion 12 integrated with each other and the female thread portion 16 were joined with each other by friction welding, thereby manufacturing a drilling rod 10 having a shape shown in FIG. 1A.

Further, in the drilling rod 10 of FIG. 1A, the length $L_1$ of the male thread portion 14 in an axial direction is 150 mm, the length $L_2$ of the stem portion 12 in the axial direction is 3510 mm, and the length $L_3$ of the female thread portion 16 in the axial direction is 180 mm.

The male thread 18 has an outer diameter of 50.8 mm and a length $L_4$ of 93 mm in the axial direction, and the female thread 20 has an inner diameter of 50.8 mm and a length $L_5$ of 75 mm in the axial direction.

As a comparative example (comparative example A in Table 1), a drilling rod 10 was manufactured by the same method as the above-mentioned method except that a conventionally-used kind of steel was applied and carburizing and quenching was performed as a heat treatment.

The high frequency quenching, the carburizing and quenching, and the friction welding were performed under the following conditions.

<High Frequency Quenching>
Frequency: 30 kHz, Power: 270 kW, Rotation Rate: 200 rpm, Heating Time: 6 seconds, Cooling: Water-Cooling
<Carburizing and Quenching>
Carburizing Method: Gas Carburizing Method
(a) Carburizing
Temperature: 940° C., Time: 4 hours, Carbon Potential: 1.1%
(b) Diffusing
Temperature: 940° C., Time: 4 hours, Carbon Potential: 0.8%
(c) Quenching
Temperature: 870° C., Time: 30 minutes, Cooling: Fan Cooling
<Friction Welding>
Rotation Rate: 870 rpm, Pressure during pressure welding: 12 kgf/mm², Approach Margin: 4.0 mm With respect to each drilling rod 10 manufactured as described above, each of characteristics of hardness of the surface layer, hardness of the center portion, minimum value of the hardness, and impact value was evaluated.

<Hardness of Surface Layer and Hardness of Center Portion>

Figure 1B:
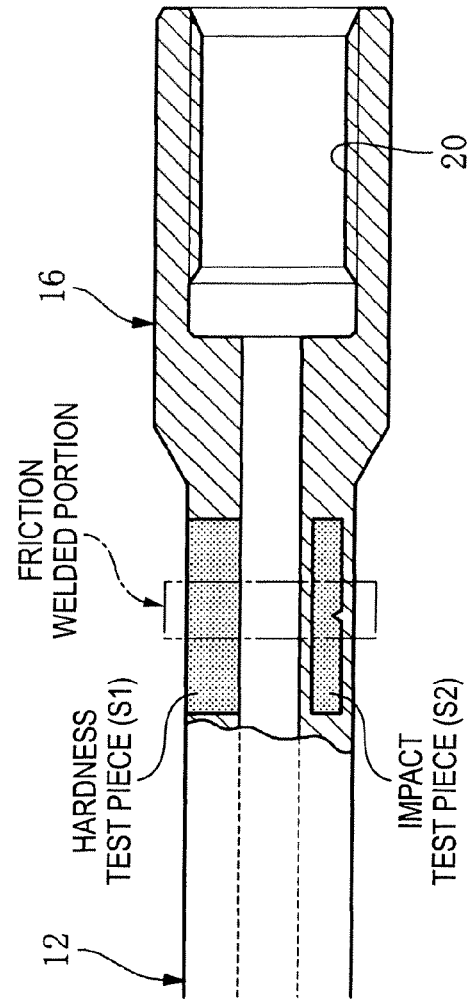
Figure 2A:
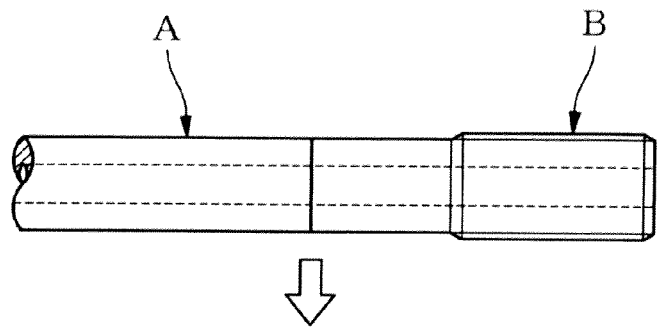
FIGS. 2A to 2C are explanatory views of the background of the present invention, where a temperature distribution and a hardness distribution at a joint portion formed by friction welding and around the joint portion are shown.
Figure 2B:
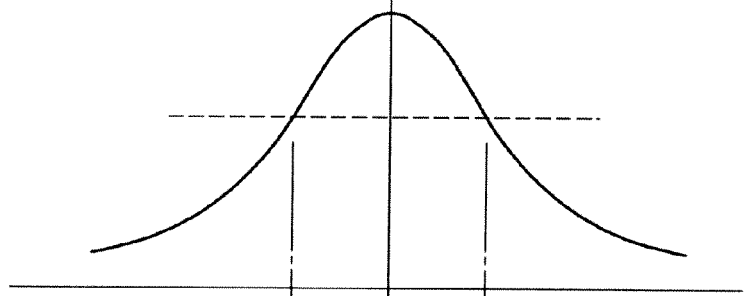
Figure 2C:
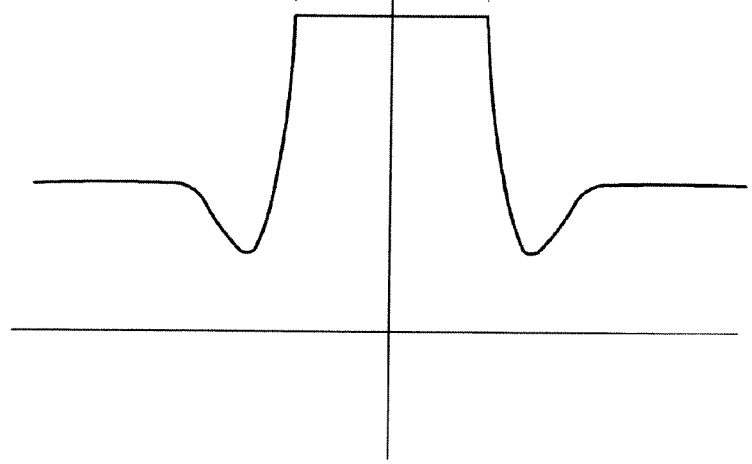

As shown in FIG. 1B, a hardness test piece S1 including a friction welding portion was taken, and hardnesses of the surface layer and the thick center portion of the joint portion having been subject to the quenching were measured.

The hardness measurement was performed in accordance with JIS Z 2244 (Vickers Hardness Test-Test Method). The measurement was performed by three test pieces, and an average thereof was used for evaluation.

<Minimum Value of Hardness (Lowest Hardness)>

Here, the minimum value of hardness represents the hardness of a portion having the lowest hardness around the friction welding portion, and the lowest-hardness portion often corresponds to a portion whose hardness has been lowered by the effect of the quenching.

Similarly to the measurement on the hardness of the center portion, the hardnesses of the thick center portion of the test piece S1 were measured at intervals of 1 mm in the longitudinal direction as shown in FIG. 1C, and the minimum value of the hardness (lowest hardness) was found.

In this case, the hardness measurement was performed in accordance with JIS Z 2244 (Vickers Hardness Test-Test Method) by three test pieces, and an average thereof was used for evaluation.

<Impact Value Measurement>

As shown in FIG. 1B, test pieces S2 for an impact test including the friction welding portion were taken from the thick center portion, and absorbed energy of each V-notched test piece was examined.

This test was performed in accordance with JIS Z 2242 (Method for Charpy Impact Test of Metallic Materials), and absorbed energy at the V-notched test piece was measured. The measurement was performed by three test pieces, and an average thereof was used for evaluation.

The results are shown in Table 2.

TABLE 1

| | | Chemical compositions (Percent by Mass) | | | | | | | | | | | | |
|---|---|---|---|---|---|---|---|---|---|---|---|---|---|---|
| | No. | C | Si | Mn | P | S | Cu | Ni | Cr | Mo | B | Ti | Al | N |
| EXAMPLES | 1 | 0.28 | 0.23 | 0.24 | 0.010 | 0.024 | 0.25 | 0.10 | 3.25 | 0.51 | 0.0010 | 0.011 | 0.023 | 0.010 |
| | 2 | 0.20 | 0.25 | 0.14 | 0.012 | 0.011 | 0.48 | 0.08 | 3.45 | 0.65 | 0.0008 | 0.015 | 0.006 | 0.022 |
| | 3 | 0.78 | 0.31 | 0.53 | 0.010 | 0.021 | 0.16 | 0.01 | 2.11 | 0.26 | 0.0022 | 0.022 | 0.049 | 0.016 |
| | 4 | 0.22 | 0.11 | 0.22 | 0.015 | 0.033 | 0.14 | 0.49 | 4.23 | 0.61 | 0.0014 | 0.018 | 0.016 | 0.001 |
| | 5 | 0.56 | 0.48 | 0.40 | 0.011 | 0.020 | 0.33 | 0.33 | 2.01 | 0.31 | 0.0016 | 0.007 | 0.012 | 0.047 |
| | 6 | 0.48 | 0.15 | 0.11 | 0.015 | 0.034 | 0.27 | 0.18 | 4.97 | 0.39 | 0.0020 | 0.017 | 0.034 | 0.026 |

TABLE 1-continued

| | | | | | | | Chemical compositions (Percent by Mass) | | | | | | | |
|---|---|---|---|---|---|---|---|---|---|---|---|---|---|---|
| | | No. | C | Si | Mn | P | S | Cu | Ni | Cr | Mo | B | Ti | Al | N |
| | | 7 | 0.30 | 0.21 | 0.95 | 0.013 | 0.018 | 0.28 | 0.05 | 3.98 | 0.22 | 0.0037 | 0.031 | 0.038 | 0.031 |
| | | 8 | 0.62 | 0.40 | 0.26 | 0.005 | 0.015 | 0.10 | 0.08 | 2.31 | 0.80 | 0.0011 | 0.034 | 0.025 | 0.033 |
| | | 9 | 0.52 | 0.13 | 0.52 | 0.013 | 0.022 | 0.19 | 0.14 | 2.91 | 0.71 | 0.0002 | 0.015 | 0.018 | 0.012 |
| | | 10 | 0.34 | 0.27 | 0.66 | 0.011 | 0.001 | 0.05 | 0.20 | 3.58 | 0.47 | 0.0048 | 0.013 | 0.042 | 0.007 |
| | | 11 | 0.47 | 0.22 | 0.31 | 0.011 | 0.049 | 0.40 | 0.12 | 3.46 | 0.56 | 0.0015 | 0.005 | 0.022 | 0.029 |
| | | 12 | 0.59 | 0.31 | 0.34 | 0.013 | 0.017 | 0.02 | 0.15 | 2.55 | 0.52 | 0.0013 | 0.048 | 0.024 | 0.034 |
| COMPARATIVE | | A | 0.25 | 0.25 | 0.26 | 0.011 | 0.022 | 0.23 | 2.75 | 1.31 | 0.23 | 0.0011 | 0.012 | 0.021 | 0.009 |
| EXAMPLES | | B | 0.17 | 0.21 | 0.23 | 0.012 | 0.023 | 0.14 | 0.07 | 3.12 | 0.47 | 0.0012 | 0.014 | 0.025 | 0.012 |
| | | C | 0.95 | 0.23 | 0.21 | 0.011 | 0.024 | 0.15 | 0.03 | 3.23 | 0.52 | 0.0010 | 0.015 | 0.023 | 0.010 |
| | | D | 0.26 | 0.25 | 0.05 | 0.014 | 0.025 | 0.13 | 0.06 | 3.21 | 0.49 | 0.0014 | 0.011 | 0.021 | 0.021 |
| | | E | 0.23 | 0.31 | 1.21 | 0.012 | 0.021 | 0.20 | 0.11 | 3.24 | 0.42 | 0.0013 | 0.013 | 0.031 | 0.009 |
| | | F | 0.22 | 0.18 | 0.28 | 0.010 | 0.027 | 0.18 | 0.12 | 1.78 | 0.39 | 0.0018 | 0.016 | 0.018 | 0.015 |
| | | G | 0.45 | 0.27 | 0.31 | 0.012 | 0.024 | 0.21 | 0.16 | 5.31 | 0.51 | 0.0009 | 0.012 | 0.021 | 0.013 |
| | | H | 0.32 | 0.19 | 0.26 | 0.014 | 0.022 | 0.24 | 0.17 | 3.25 | 0.14 | 0.0017 | 0.019 | 0.027 | 0.020 |
| | | I | 0.22 | 0.22 | 0.30 | 0.015 | 0.019 | 0.22 | 0.11 | 3.20 | 0.92 | 0.0015 | 0.021 | 0.016 | 0.014 |
| | | J | 0.28 | 0.16 | 0.27 | 0.014 | 0.020 | 0.26 | 0.12 | 3.26 | 0.52 | 0.0001 | 0.018 | 0.022 | 0.021 |
| | | K | 0.29 | 0.33 | 0.24 | 0.012 | 0.024 | 0.19 | 0.19 | 3.31 | 0.54 | 0.0072 | 0.019 | 0.028 | 0.011 |

TABLE 2

| | | | | Properties | | | |
|---|---|---|---|---|---|---|---|
| | | No | Manufacturing Method | Heat Treatment | Hardness of 5 mm Surface Layer (HV 0.3) | Hardness of Center Portion (HV 0.3) | Minimum Value of Hardness (HV 0.3) | Impact Value (KV$_8$, J/cm$^2$) |
| EXAMPLES | 1 | Pressure Welding | High frequency quenching | 606 | 408 | 325 | 28.2 |
| | 2 | Pressure Welding | High frequency quenching | 598 | 397 | 331 | 29.1 |
| | 3 | Pressure Welding | High frequency quenching | 643 | 411 | 303 | 27.3 |
| | 4 | Pressure Welding | High frequency quenching | 599 | 395 | 351 | 27.8 |
| | 5 | Pressure Welding | High frequency quenching | 621 | 413 | 325 | 26.9 |
| | 6 | Pressure Welding | High frequency quenching | 619 | 409 | 342 | 27.0 |
| | 7 | Pressure Welding | High frequency quenching | 615 | 406 | 330 | 27.5 |
| | 8 | Pressure Welding | High frequency quenching | 635 | 400 | 329 | 26.5 |
| | 9 | Pressure Welding | High frequency quenching | 622 | 402 | 319 | 28.7 |
| | 10 | Pressure Welding | High frequency quenching | 609 | 399 | 326 | 29.1 |
| | 11 | Pressure Welding | High frequency quenching | 611 | 397 | 329 | 27.5 |
| | 12 | Pressure Welding | High frequency quenching | 632 | 401 | 317 | 26.8 |
| COMPARATIVE EXAMPLES | A | Pressure Welding | Carburizing and quenching | 656 | 415 | 270 | 15.1 |
| | B | Pressure Welding | High frequency quenching | 423 | 411 | 301 | 31.6 |
| | C | Pressure Welding | High frequency quenching | 781 | 518 | 342 | 13.1 |
| | D | Pressure Welding | High frequency quenching | 614 | 301 | 289 | 11.8 |
| | E | Pressure Welding | High frequency quenching | 601 | 415 | 319 | 12.2 |
| | F | Pressure Welding | High frequency quenching | 603 | 418 | 283 | 28.5 |
| | G | Pressure Welding | High frequency quenching | 612 | 422 | 321 | 11.6 |
| | H | Pressure Welding | High frequency quenching | 637 | 419 | 296 | 26.3 |
| | I | Pressure Welding | High frequency quenching | 598 | 402 | 360 | 10.9 |
| | J | Pressure Welding | High frequency quenching | Product manufacturing was impossible due to breakage during rolling | | | |
| | K | Pressure Welding | High frequency quenching | 602 | 401 | 319 | 11.1 |

Table 2 shows the properties evaluated under evaluation standards where the target value of the hardness of 0.5 mm surface layer was 590 HV or more, the target value of the hardness of the center portion was 300 HV or more, the target value of the minimum value of the hardness was 300 HV or more, and the target value of the impact value was 15 J/cm$^2$ or more.

As shown in Table 2, in a comparative example A using a kind of steel having the Cr content of 1.31% which is lower than 2.00% as the lower limit of content of Cr defined in the present invention and the Ni content of 2.75% which is higher than 0.50% as the upper limit of the content of Ni defined in the present invention, a reduction in hardness was large in the vicinity of the joint portion during friction welding.

In a comparative example B having the C content of 0.17% which is lower than 0.20% as the lower limit of the content of C defined in the present invention, the hardness of the surface layer was low. In a comparative example C having the C content of 0.95% which is higher than 0.80% as the upper limit of content of C defined in the present invention, the impact value was low.

In a comparative example D having the Mn content of 0.05% which is lower than 0.10% as the lower limit of content of Mn defined in the present invention, the minimum value of the hardness and the impact value were low. In a comparative example E having the Mn content of 1.21% which is higher than 1.00% as the upper limit of content of Mn defined in the present invention, the impact value was low.

In a comparative example F having the Cr content of 1.78% which is lower than 2.00% as the lower limit of content of Cr defined in the present invention, since secondary hardening attributable to Cr carbide precipitation was not sufficiently achieved during the friction welding, the minimum value of the hardness was low.

In a comparative G having the Cr content of 5.31% which is higher than 5.00% as the upper limit of content of Cr defined in the present invention, the impact value was low.

In a comparative example H having the Mo content of 0.14% which is lower than 0.20% as the lower limit of content of Mo defined in the present invention, the minimum value of the hardness was low. In a comparative example I having the Mo content of 0.92% which is higher than 0.80% as the upper limit of content of Mo defined in the present invention, the impact value was low.

In a comparative example J having the B content lower than the lower limit of B content defined in the present invention, product manufacturing was not possible due to breakage during rolling.

In a comparative example K having the B content higher than the upper limit of B content defined in the present invention, the impact value was low.

In contrast, in all embodiments of the present invention, the characteristics such as the surface layer hardness, the center portion hardness, the minimum value of the hardness, and the impact value show good values.

In other words, according to the present invention, even when joining is performed by friction welding, it is possible to achieve the same levels of good characteristics as those of a case where a drilling rod is manufactured in an integral structure without the necessity of a heat treatment on the entire rod after the joining, and thus it is possible to expect a life of the drilling rod substantially the same as that of the case where a drilling rod is manufactured in an integral structure.

Although the embodiments of the present invention have been described above, the embodiments are merely examples and the present invention should not be limited thereto.

The present invention can be implemented in various forms without departing from the scope of the present invention. For example, the present invention can be applied to a drilling rod in which both thread portions are male thread portions, a drilling rod in which both thread portions are female thread portions, etc.

This application is based on Japanese patent application No. 2011-033941 filed Feb. 18, 2011, the entire contents thereof being hereby incorporated by reference.

What is claimed is:

1. A hollow drilling steel rod comprising a stem portion and a thread portion positioned at an end portion in an axial direction with respect to the stem portion,
the hollow drilling steel rod being constituted of a steel having a composition consisting of, in terms of percent by mass:
0.20 percent to 0.80 percent of C,
0.10 percent to 0.50 percent of Si,
0.10 percent to 1.00 percent of Mn,
0.015 percent or less of P,
0.050 percent or less of S,
0.50 percent or less of Cu,
less than 0.50 percent of Ni,
2.00 percent to 5.00 percent of Cr,
0.20 percent to 0.80 percent of Mo,
0.0002 percent to 0.0050 percent of B,
0.005 percent to 0.050 percent of Ti,
0.005 percent to 0.050 percent of Al,
0.050 percent or less of N, and
the remainder being Fe and inevitable impurities,
wherein the thread portion comprises a thread having been subjected to a high frequency quenching, and
wherein the thread portion and the stem portion separate from each other have been joined by a friction welding.

2. A method of manufacturing a hollow drilling steel rod comprising a stem portion and a thread portion positioned at an end portion in an axial direction with respect to the stem portion, said method comprising:
separately constituting the stem portion and the thread portion with a steel having a composition consisting of, in terms of percent by mass:
0.20 percent to 0.80 percent of C,
0.10 percent to 0.50 percent of Si,
0.10 percent to 1.00 percent of Mn,
0.015 percent or less of P,
0.050 percent or less of S,
0.50 percent or less of Cu,
less than 0.50 percent of Ni,
2.00 percent to 5.00 percent of Cr,
0.20 percent to 0.80 percent of Mo,
0.0002 percent to 0.0050 percent of B,
0.005 percent to 0.050 percent of Ti,
0.005 percent to 0.050 percent of Al,
0.050 percent or less of N, and
the remainder being Fe and inevitable impurities;
subjecting a thread of the thread portion to a high frequency quenching; and then
joining the thread portion and the stem portion to each other by a friction welding.

* * * * *

UNITED STATES PATENT AND TRADEMARK OFFICE
CERTIFICATE OF CORRECTION

PATENT NO. : 8,430,977 B2
APPLICATION NO. : 13/399063
DATED : April 30, 2013
INVENTOR(S) : Masaya Hisada et al.

It is certified that error appears in the above-identified patent and that said Letters Patent is hereby corrected as shown below:

Title page, item (73) Assignee should read as follows:

MITSUBISHI MATERIALS CORPORATION
Tokyo (JP)
DAIDO STEEL CO., LTD.
Nagoya, AICHI (JP)

Signed and Sealed this
Fifteenth Day of October, 2013

Teresa Stanek Rea
*Deputy Director of the United States Patent and Trademark Office*